F. E. WYNNE.
SYSTEM OF CONTROL.
APPLICATION FILED JAN. 4, 1916.
1,289,346.
Patented Dec. 31, 1918.
3 SHEETS—SHEET 1.
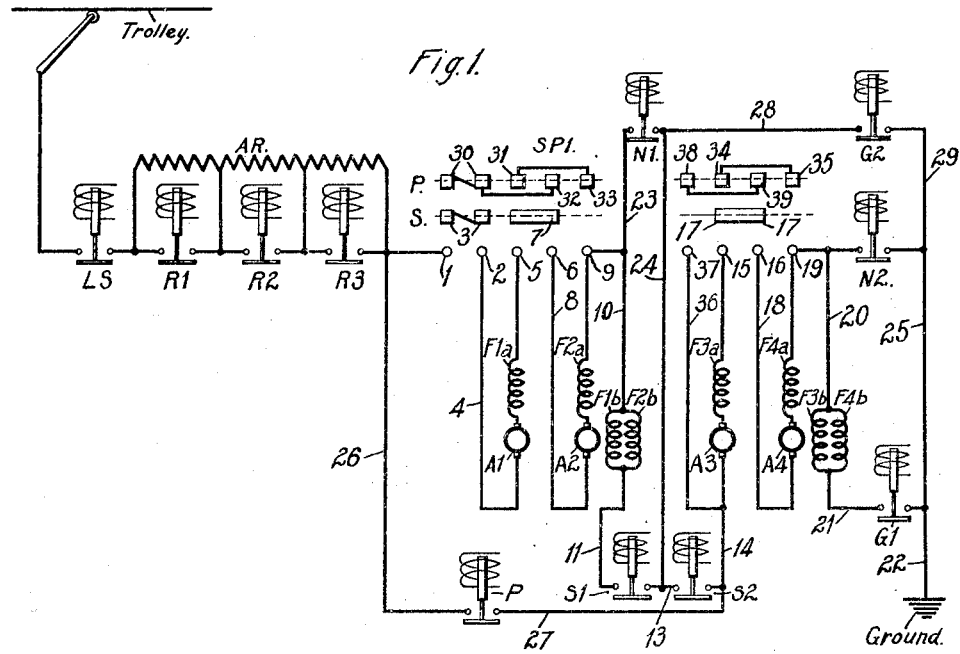
Fig. 1.
Fig. 2.
| | LS | S1 | S2 | G1 | R1 | R2 | R3 | N1 | N2 | P | G2 |
|---|---|---|---|---|---|---|---|---|---|---|---|
| a | o | o | o | o | | | | | | | |
| b | o | o | o | o | o | | | | | | |
| c | o | o | o | o | o | o | | | | | |
| d | o | o | o | o | o | o | o | | | | |
| e | o | | o | | o | o | o | o | | | |
| | o | | o | | | | | o | o | o | |
| f | o | o | | o | | | | | o | o | |
| g | o | o | | | o | o | | | o | o | |
| h | o | o | | | o | o | | | o | o | |
| i | o | o | | | o | o | o | | o | o | |
| j | o | | | | o | o | o | o | o | o | |
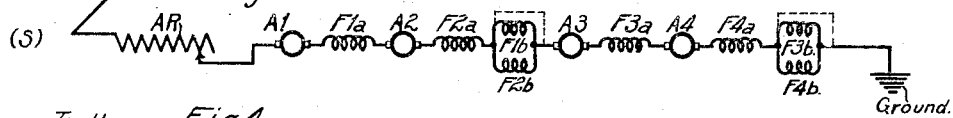
Fig. 3.
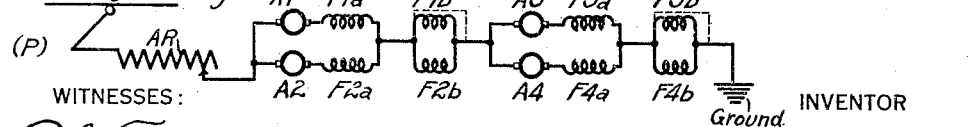
Fig. 4.
WITNESSES:
R. J. Fitzgerald
W. B. Wells
INVENTOR
Francis E. Wynne.
BY
Wesley G. Carr
ATTORNEY

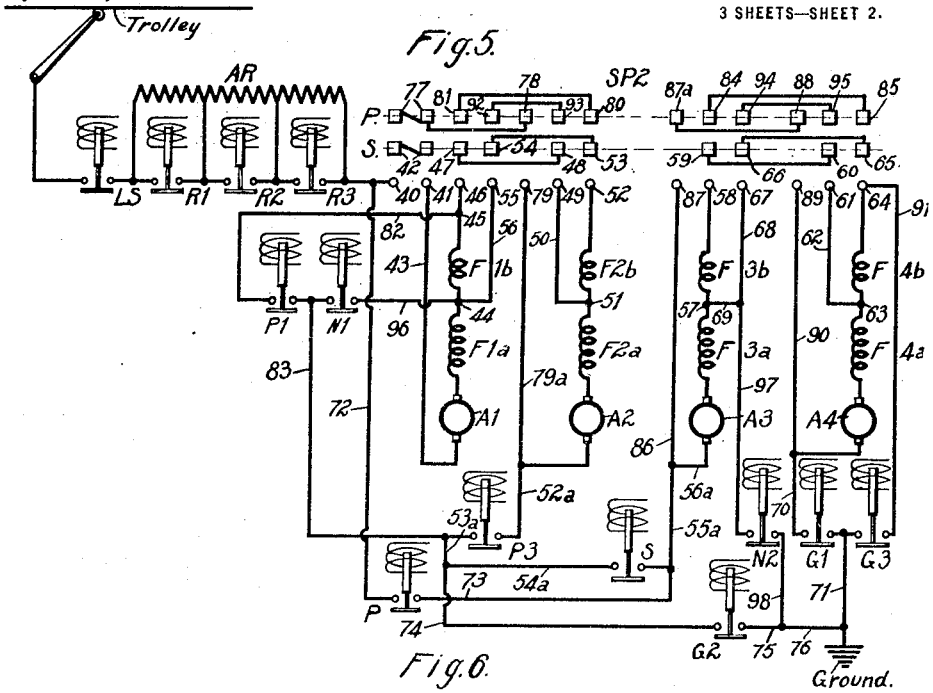

F. E. WYNNE.
SYSTEM OF CONTROL.
APPLICATION FILED JAN. 4, 1916.
1,289,346.
Patented Dec. 31, 1918.
3 SHEETS—SHEET 3.
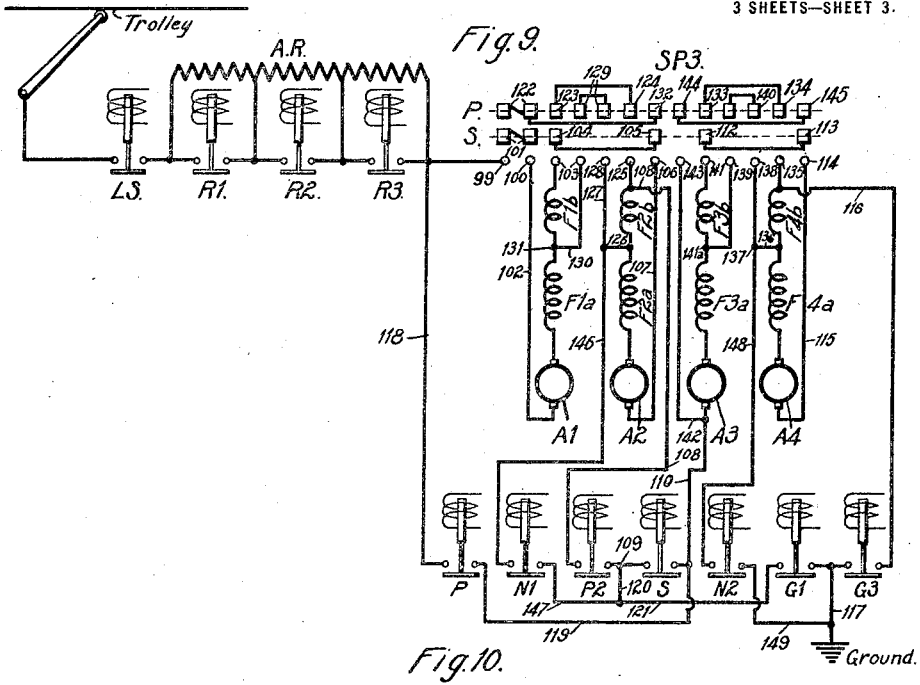
INVENTOR
Francis E. Wynne,
BY
ATTORNEY

UNITED STATES PATENT OFFICE.

FRANCIS E. WYNNE, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,289,346.   Specification of Letters Patent.   Patented Dec. 31, 1918.

Application filed January 4, 1916. Serial No. 70,230.

*To all whom it may concern:*

Be it known that I, FRANCIS E. WYNNE, a citizen of the United States, and a resident of Wilkinsburg, in the county of Allegheny and State of Pennsylvania, have invented a new and useful Improvement in Systems of Control, of which the following is a specification.

My invention relates to systems of control and it has special reference to the operation of motors of the "field-control" type for electric railway vehicles and the like.

The object of my invention is to provide a system of the above-indicated character which shall embody means that is relatively simple and inexpensive in construction and effective and reliable in operation, for obtaining several additional operating speeds by certain novel connections of series-type field-magnet windings.

More specifically stated, it is the object of my invention to employ a so-called series-parallel switching device that is adapted to dispose a plurality of motor armatures in initial series and series-parallel relation and is also adapted to manipulate the field-winding connections differently in the several positions thereof.

In the prior art, systems of the "field-control" type have generally excluded from circuit certain portions of the field windings at the end of series or parallel acceleration or both, or, in other words, the field-winding connections have remained the same throughout operation and the manipulation thereof to provide "field-control" has been identical in all cases.

According to my present invention, I provide various novel field-winding connections for affording a number of steps of field control under predetermined conditions, in accordance with the position of a "series-parallel" switching device, as hereinafter more fully set forth.

In the accompanying drawings, Figure 1 is a diagrammatic view of the main circuits of a system of control embodying my invention; Fig. 2 is a sequence chart of well-known form for indicating the preferred sequence of operation of the several motor-controlling switches that are illustrated in Fig. 1; Fig. 3 and Fig. 4 are simplified diagrammatic views of main-circuit connections under predetermined conditions, as set forth more fully later; and Figs. 5 to 8, inclusive, and Figs. 9 to 12, inclusive, are views that correspond, respectively, to Figs. 1 to 4, inclusive, of two other modifications of my invention.

Referring to Fig. 1 of the drawings, the system shown comprises a plurality of suitable supply-circuit conductors respectively marked Trolley and Ground; a plurality of electric motors respectively having armatures A1, A2, A3 and A4 and field-magnet windings respectively comprising sections F1a and F1b, F2a and F2b, F3a and F3b, and F4a and F4b; a "series-parallel" switching device SP1 for arranging the motor armatures in initial series or series-parallel relation, as described more fully later; an accelerating resistor AR with which is associated a plurality of resistor short-circuiting switches R1, R2 and R3; a plurality of motor-controlling switches LS, S1, S2, G1, P and G2; and a pair of switches N1 and N2 for varying certain field-winding connections in conjunction with the series-parallel switching device.

Inasmuch as the particular governing system for manipulating the various motor-controlling switches in accordance with the sequence chart of Fig. 2 is immaterial to my present invention, I have not deemed it necessary to show or describe any such system. Those skilled in the art will be readily able to supply a master controller of the usual type for energizing the actuating coils of the various switches in the desired sequence; or, if desired, of course, a main-circuit controller of a familiar type having a plurality of control fingers and contact segments that respectively correspond to the various illustrated switches may be used. Moreover, for the sake of simplicitiy and clearness, the usual and necessary main-circuit reversing-switch has been omitted.

The series-parallel switching device SP1 is preferably of the familiar drum type and embodies a plurality of main-circuit control fingers and contact segments, as hereinafter pointed out with particularity, for initially connecting the various motor armatures in series relation or in series-parallel relation, dependent upon which of the positions *s* or *p* is employed, the complete main-circuit connections when the series-parallel switching device occupies its respective positions being illustrated in Fig. 3 and Fig. 4, respectively.

Assuming that it is desired to accelerate the motors, and that the switching device SP1 occupies its position s, the master controller or other governing device (not shown) may be moved to its initial position a, whereupon the switches LS, S1, S2 and G1 are closed, as indicated in Fig. 2.

A main circuit is thus established from the positive supply-circuit conductor Trolley, through the switch LS, the entire accelerating resistor AR, control fingers 1 and 2, which are bridged by contact segment 3 of the series-parallel switching device in its position s, conductor 4, armature A1, field-winding section F1a, control fingers 5 and 6, which are bridged by contact segment 7 of the series parallel switching device, conductor 8, armature A2, field-winding section F2a, control finger 9, conductor 10, the parallel-connected field-winding sections F1b and F2b, conductor 11, switch S1, conductor 13, switch S2, conductor 14, armature A3, field-winding section F3a, control fingers 15 and 16, which are bridged by contact segment 17 of the series-parallel switching device, conductor 18, armature A4, field-winding section F4a, control finger 19, conductor 20, the parallel-connected field-winding sections F3b and F4b, conductor 21, switch G1, and conductor 22 to the negative conductor Ground. The main-circuit connections at this time are illustrated by the solid lines of Fig. 3.

In positions b c and d of the governing controller, the switches R1, R2 and R3 are respectively closed, thereby short-circuiting the accelerating resistor AR in a gradual manner, in accordance with a familiar practice.

In position e, the switches N1 and N2 are first closed and then the switches S1 and G1 are opened, whereby the parallel-connected field-winding portions F1b and F2b, and F3b and F4b, are entirely excluded from circuit, as indicated by the dotted lines of Fig. 3 and in accordance with the main circuit about to be traced. The closure of the switch N1 completes a circuit from the control finger 9, through conductor 23, switch N1 and conductor 24 to conductor 13, while the closure of the switch N2 establishes a circuit from conductor 19, through switch N2 and conductor 25 to the negative conductor 22. Upon the subsequent opening of switches S1 and G1, the pairs of parallel-connected field-winding portions are open-circuited at the switches S1 and G1, respectively.

During the "shunting" transition of the motors from series to series-parallel relation, the switches R1, R2 and R3 are first opened, and switch P is closed, and as soon as the governing controller (not shown) reaches its position f, the switches S1, G1 and G2 are closed while switches N1, N2 and S2 are opened. In this way, a circuit is first completed from the resistor AR, through conductor 26, switch P and conductor 27 to conductor 14, whereby the armature A3 is connected to the Trolley through the resistor AR; and conductor 13 is connected through conductors 24 and 28, switch G2 and conductor 29 to the negative conductor 25, thus connecting the parallel-related field-winding portions F1b and F2b to the negative conductor Ground.

At this time, therefore, the circuits, respectively, comprising armature A1, field-winding portion F1a, armature A2, field-winding portion F2a and the parallel-related field-winding sections F1b and F2b, and armature A3, field-winding section F3a, armature A4, field-winding section F4a and the parallel-related field-winding portions F3b and F4b are connected in parallel relation, the entire accelerating resistor AR being connected in common series relation with the parallel circuits just recited.

In positions g, h and i, the switches R1, R2 and R3 are again successively closed to gradually short-circuit the accelerating resistor, and, in the final position j, the switches N1 and N2 are closed, and the switches S1 and G1 are subsequently opened to again exclude the pairs of parallel-related field-winding sections from circuit.

If it is desired to effect further acceleration of the motors, the governing controller (not shown) may be returned to its off position, the series-parallel switching device SP1 may be moved to its position p, and the governing controller may then again be operated through its successive positions a to j, inclusive, to effect the circuit connections that are set forth below.

The initial circuit connections, under the assumed circumstances, are illustrated in Fig. 4. It will be observed that the parallel-related field-winding portions F1b and F2b are connected in series relation with the corresponding pairs of parallel-related circuits that respectively comprise armature A1 and field-winding portion F1a and armature A2 and field-winding portion F2a. The other parallel-connected field-winding portions F3b and F4b are similarly connected with respect to the remaining armatures and field-winding portions.

The main-circuit connections are established from the trolley up through switch LS, the entire accelerating resistor AR, control fingers 1 and 2, which are bridged by contact segment 30 of the series-parallel switching device, where the circuit divides, one branch including conductor 4, armature A1, field-winding section F1a, control finger 5 and contact segment 31, and the other branch including contact segment 32, which is directly connected to contact segment 30, control finger 6, conductor 8, armature A2, field-winding section F2a, control finger 9, and contact segment 33 which is directly connected to contact segment 31. The corresponding armatures and field-winding sections A1 and F1a, and A2 and F2a are thus connected in parallel relation. Circuit is continued from control finger 9 through the parallel-related field-winding sections, as hereinbefore described, to conductor 14, where the circuit again divides, one branch including armature A3, field-winding sections F3a, control finger 15, contact segments 34 and 35, and control finger 19, and the other branch including conductor 36, control finger 37, contact segments 38 and 39, control finger 16, conductor 18, armature A4, field-winding section F4a, and control finger 19, whence circuit is completed through the parallel-related field-winding portions F3b and F4b, as previously set forth.

In positions b, c and d of the governing controller (not shown), switches R1, R2 and R3 are closed, as already described, to gradually short-circuit the accelerating resistor AR, while, in position e, the switches N1 and N2 are closed and switches S1 and G1 are opened for the purpose hereinbefore set forth.

"Shunting" transition of the pairs of motors is then effected in a manner similar to that previously described, and, subsequently, the resistor AR is again gradually short-circuited, and the pairs of parallel-related field-winding portions are again excluded from circuit.

It will be observed that the extra connections necessary for utilizing the above-described embodiment of my invention are relatively few, inasmuch as, while the usual "field-control" motors requires five external leads; namely, two corresponding to the armature terminals, two corresponding to the exterior terminals of the combined field-winding sections and one corresponding to the junction-point of the field-winding sections of the four motors employed in carrying out the invention hereinbefore set forth, two of them require only the leads just mentioned, while the other two require an additional lead or a total of six each. The foregoing will be evident from the fact that, throughout the accelerating period, the field-winding sections F2a and F4a are permanently connected to the parallel-related field-winding portions F1b and F2b, and F3b and F4b, respectively.

It will be understood that, if desired, the use of "normal" field operation by the manipulation of the switches N1 and N2 may be omitted from full series and full series-parallel relation of the motors and may be used only when the motors are connected in full parallel relation.

Reference may now be had to Fig. 5, wherein the system shown comprises the supply-circuit conductors, the motors, and the accelerating resistor AR, as already described; a series-parallel switching device SP2 for performing functions similar to those described in connection with Fig. 1; and a plurality of motor-controlling switches LS, S, R1, R2, R3, P, G2, P1, P3, G3, G1, N1, and N2.

Assuming that it is desired to accelerate the motors, the master controller may be moved to its initial operative position a, whereupon switches LS, S, P3 and G1 are closed, as indicated in Fig. 6. A circuit is thus established from the Trolley through switch LS, accelerating resistor AR, control fingers 40, and 41, which are bridged by contact segment 42 of the series-parallel switching device SP2, conductor 43, armature A1, field-winding section F1a, junction-point 44 of the field-winding sections F1a and F1b, field winding portion F1b, a second-junction point 45, control finger 46, contact segments 47 and 48, and control finger 49 of the series-parallel switching device, conductor 50, junction-point 51 of the field-winding sections F2a and F2b, field-winding section F2b, control finger 52, contact segments 53 and 54, control finger 55 and conductor 56 to the junction point 44, whereby the field-winding portions F1b and F2b are connected in parallel-circuit relation. Circuit is continued from the above-mentioned junction-point 51 through field-winding section F2a, armature A2, conductor 52a, switch P3, conductors 53a and 54a, switch S, conductors 55a and 56a, armature A3, field-winding section F3a, junction-point 57 of the field-winding sections F3a and F3b, field-winding section F3b, control finger 58, contact segments 59 and 60 and control finger 61 of the series-parallel switching device, conductor 62, junction-point 63 of the field-winding sections F4a and F4b, field-winding section F4b, control finger 64, contact segments 65 and 66, control finger 67 and conductors 68 and 69 to the junction-point 57, whereby the field-winding portions F3b and F4b are connected in parallel-circuit relation. Circuit is completed from the junction-point 63 through field-winding section F4a, armature A4, conductor 70, switch G1, and conductor 71 to the negative supply-circuit conductor Ground.

The main-circuit connections at this time are illustrated in Fig. 7.

In positions b, c and d of the governing controller (not shown), the accelerating resistor AR is gradually short-circuited, and shunting transition of the pairs of motors to series-parallel relation is then effected by the closure of the switch P, the opening of the switch S and the closure of the switch G2, the resistor short-circuiting switches being first opened during the transition. One new circuit is thus completed from the resistor AR, through conductor 72, switch P and conductor 73, which is connected to conductor 55a, thereby connecting the armature A3 to the positive supply-circuit conductor through the resistor AR; and a further circuit is completed from conductor 53a through conductor 74, switch G2 and conductors 75 and 76 to the negative conductor Ground, thus connecting the armature A2 directly to the negative side of the supply circuit.

In positions $f$, $g$ and $h$, the accelerating resistor is again gradually short-circuited, and the pairs of motors having the armatures A1 and A2 and A3 and A4, respectively, are connected in full parallel relation, or, in other words, the four motors are connected in full series-parallel relation. To effect further acceleration of the motors, the main circuit is opened by returning the governing controller (not shown) to its off position or by actuating it beyond its position $h$ to an intermediate open position; the series-parallel switching device SP2 may then be actuated to its position $p$, and the governing controller may next be actuated to a new position $a'$, wherein the switches LS, S, P1 and G3 are closed.

A circuit is thus initially established from the trolley through switch LS, the entire accelerating resistor AR, control fingers 40 and 41, which are bridged by contact segment 77 of the series-parallel switching device, where the circuit divides, one branch including control fingers 41, conductor 43, armature A1, field winding section F1a and F1b, and junction-point 45, and the other branch including contact segment 78, which is directly connected to contact segment 77, control finger 79, conductor 79a, armature A2, field-winding sections F2a and F2b, control finger 52, contact segments 80 and 81, control finger 46, and the junction-point 45, whence circuit is completed through conductor 82, switch P1, conductors 83, 53a and 54a, and switch S to conductor 55a, where the circuit divides, one branch including conductor 56a, armature A3, field-winding sections 53a and 53b, control finger 58, contact segments 84 and 85 and control finger 64 of the series-parallel switching device, and the other branch including conductor 86, control finger 87, contact segment 87a and 88, control finger 89, conductor 90, armature A4, field-winding sections F4a and F4b and control fingers 64, whence circuit is completed through conductor 91, switch G3, and conductor 71 to the negative conductor Ground. The main circuit connections at this time are set forth in the diagram of Fig. 8.

It will be observed that the directions of current through the motors having the armature A2 and field-winding sections F2a and F2b and having the armature A4 and field-winding portions F4a and F4b, respectively, are reversed when the series-parallel switching device is thrown to its position $p$, as is most clearly shown in Fig. 8.

In positions $b'$, $c'$ and $d'$ of the governing controller (not shown), the accelerating resistor AR is gradually short-circuited, while, in position $e'$, the switches N1 and N2 are closed and the switches P1 and G3 are then opened to provide an additional step of "field control."

The closure of the switch N1 completes a circuit from junction-point 44 of the field-winding sections F1a and F1b through conductor 96, switch N1, and thence, through conductor 83, as already set forth; while the closure of the switch N2 completes a circuit from conductor 69 through conductor 97, switch N2 and conductor 98 to the negative conductor 76. Since the switches P1 and G3 are opened, the parallel-related field-winding portions F1b and F2b and F3b and F4b are open-circuited at the switches P1 and G3, respectively.

"Shunting" transition of the series-parallel-related motors to parallel relation is then effected by opening the resistor-short-circuiting switches, closing the switches P, P1 and G3, opening the switches N1, N2 and S, and closing the switch G2, in that order, whereby the pairs of parallel-related motors are connected in parallel relation in accordance with the circuits associated with the switches P and G2, as previously traced.

In positions $g'$, $h'$ and $i'$, the accelerating resistor AR is again gradually short-circuited, while, in the final position $j'$, the switches N1 and N2 are closed and switches P1 and P3 are opened, for the purpose already set forth.

It will be noted that, in the position $s$ of the series-parallel switching device, the parallel-related portions of the field-magnet windings are connected in series relation with the remaining motor windings during the first portion of the accelerating period, while, in the other position $p$ of the series-parallel switching device, the parallel-related portions are connected in series relation with the corresponding pairs of parallel-related circuits that respectively comprise an armature winding and the corresponding remaining portion of the field winding, the currents in two of the motors being in reversed directions during the operation, when the series-parallel switching device occupies its different positions.

Although I have omitted the use of "normal" field connections by the operation of switches N1 and N2, when the motors are in full-series and the initial full-series-parallel relation, it will be understood that such "normal" field connections may be employed, if desired, at the times specified.

Referring now to Fig. 9, the system shown comprises the supply-circuit conductors Trolley and Ground, the several electric motors and the accelerating resistor AR, as previously described; and, in addition, a series-parallel switching device SP3 for performing functions similar to those already set forth in connection with the other systems and a plurality of motor-controlling switches LS, S, R1, R2 and R3, P, G1, P2, N1, N2 and G3.

Assuming that it is desired to effect acceleration of the motors, with the series-parallel switching device occupying its position $s$, the governing controller (not shown) may be actuated to its initial operative position $a$, whereupon the switches LS, S, P2 and G3 are closed. A circuit is thus initially established from the trolley through switch LS, the entire accelerating resistor AR, control fingers 99 and 100, which are bridged by contact segment 101 of the series-parallel switching device SP3, conductor 102, armature A1, field-winding sections F1$a$ and F1$b$, control finger 103, contact segments 104 and 105 and control finger 106 of the series-parallel switching device, conductor 107, field-winding sections F2$a$ and F2$b$, conductor 108, switch P2, conductor 109, switch S, conductor 110, armature A3, field-winding sections F3$a$ and F3$b$, control finger 111, contact segments 112 and 113, control finger 114, conductor 115, armature A4, field-winding portions F4$a$ and F4$b$, conductor 116, switch G3 and conductor 117 to the negative conductor Ground. All the armatures and field-winding sections are thus connected in series-circuit relation, as illustrated in Fig. 11.

Upon actuation of the governing controller (not shown) through positions $b$, $c$ and $d$, the switches R1, R2 and R3 are successively closed to gradually short-circuit the accelerating resistor AR.

To effect "shunting" transition of the motors to series-parallel relation, the switches R1, R2 and R3 are opened, the switch P is closed, the switch S is opened and the switch G1 is closed, in that order, whereby one circuit is established from the resistor AR, through conductor 118, switch P and conductor 119 to conductor 110, whereby the armature A3 is connected to the positive supply-circuit conductor through the resistor AR; and another circuit is completed from conductor 109 through conductors 120 and 121, and switch G1 to the negative conductor 117, thus connecting the field-winding portion F2$b$ directly to ground.

In the next three positions $f$, $g$ and $h$ of the governing controller (not shown) the accelerating resistor AR is again gradually short-circuited.

To effect continued acceleration of the motors, the governing controller (not shown) may be manipulated as previously described in connection with the system described in Fig. 5, and the series-parallel switching device SP3 may be also moved to its position $p$. When the governing controller (not shown) occupies its next operative position $a'$, the switches LS, S, P2 and G3 are all closed, whereby a circuit is established from the trolley through switch LS, the entire accelerating resistor AR, control fingers 99 and 100, which are bridged by contact segment 122 of the series-parallel switching device SP3, where the circuit divides, one branch including the control finger 100, conductor 102, armature A1, field-winding sections F1$a$ and F1$b$, control finger 103, contact segments 123 and 124 and control finger 125, field-winding section F2$b$, conductors 126 and 127, control fingers 128 and 103, which are bridged by contact segment 129, conductor 130 and the junction-point 131 of the field-winding sections F1$a$ and F1$b$, whereby the field-winding portions F1$b$ and F2$b$ are connected in parallel relation, and the other branch including contact segment 132, which is directly connected to contact segment 122, control finger 106, conductor 107, armature A2 and field-winding section F2$a$ to conductor 126. Circuit is continued through conductor 108, switch P2, conductor 109, switch S and conductor 110, where the circuit divides, one branch including armature A3, field-winding sections F3$a$ and F3$b$, control finger 111, contact segments 133 and 134 and control finger 135 of the series-parallel switching device, field-winding section F4$b$, conductors 136 and 137, control fingers 138 and 139, which are bridged by contact segment 140, and conductor 141 to the junction point 141$a$ of the field-winding sections F3$a$ and F3$b$, whereby the field-winding portions F3$b$ and F4$b$ are connected in parallel relation, and the other branch including conductor 142, control finger 143, contact segments 144 and 145 and control finger 114 of the series-parallel switching device, conductor 115, armature A4 and field-winding section F4$a$ to conductor 136. Circuit is completed from control finger 135 through conductor 116 and thence to the negative supply circuit Ground, as already set forth. The main circuit connections at this time are diagrammatically illustrated in Fig. 12.

In positions $b'$, $c'$ and $d'$ of the governing controller (not shown), the accelerating resistor AR is gradually short-circuited, while, in position $e'$, the switches N1 and N2 are closed and the switches P2 and G3 are opened, to obtain "normal" field connections by excluding the field-winding portions F1$b$ and F2$b$ and F3$b$ and F4$b$ from circuit, as about to be described.

The closure of the switch N1 completes a circuit from conductor 126 through conductor 146, switch N1 and conductor 147 to the negatively energized conductor 121, while the closure of the switch N2 completes a circuit from the conductor 136 through conductor 148, switch N2 and conductor 149 to ground. Since the switches P2 and G3 are then opened, the parallel-related field-winding portions F1b and F2b, and F3b and F4b, are open-circuited at the switches P1 and G3, respectively.

"Shunting" transition is then effected by opening the resistor-short-circuiting switches, closing the switch P, opening the switch S and closing the switch G1 in that order.

In position $f'$, switches LS, P, G1, P2 and G3 are closed, and the pairs of parallel-related motors are disposed in initial parallel relation. In positions $g'$, $h'$ and $i'$, the accelerating resistor AR is once more gradually short-circuited, and, in the final position $j'$, the switches N1 and N2 are closed and the switches P2 and G3 are then opened to again afford a further step of field control, by excluding the parallel-related portions F1b and F2b and F3b and F4b from circuit.

In the system just described, when the series-parallel switching device occupies its position $s$, all the armatures and field-winding sections are connected in series-circuit relation, while, with the series-parallel switching device occupying its other position $p$, the connections are similar to those initially effected by the actuation of the other series-parallel switches SP1 and SP2 to their position $p$. It will be understood that, if desired, the use of "normal" field connections at the end of series-parallel operation may be omitted.

It should be noted that my invention is not limited to the use of any particular system of resistor connections or to any special type of transition of the motors from one relation to another. For example, if "bridging" transition of the motors is desired, my invention may readily be adapted for use in connection therewith by those skilled in the art.

Moreover, it should also be observed that, if desired, instead of operating the motors through series and series-parallel relation and then returning the master controller to its off position, throwing the series-parallel switching device to its second position and again operating the master controller through its forward positions, as hereinbefore described, the operation just recited may be employed after the motors are disposed in full-series relation. In case the series-parallel switching device is manipulated at the end of the series accelerating period, the motors will be operated through series, series-parallel and parallel operation in three successive steps, and a portion of the master controller drum development may be omitted, whereas, in the systems hereinbefore described, the motors were operated first through series and series-parallel relation, then the motors were open-circuited and a different series-parallel combination was effected, after which the motors were changed over to full-parallel relation by the use of the transition switches. However, I have thought it best to make the fullest possible disclosure of motor operation in connection with my invention and, consequently, have described, in detail, the operation of the motors through series and series-parallel relation and then through series-parallel relation, with a different arrangement of motors, and full parallel relation. Adaptability of my system to various classes of service or desired operation will be readily apparent from the foregoing statements. For example, when running through cities and towns, it may be desirable to employ simple series and series-parallel operation, while, during the interurban portion of the run, only series-parallel and parallel operation may be desirable, in order to maintain a higher schedule speed.

I do not wish to be restricted to the specific circuit conections or arrangement and location of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a plurality of electric motors severally having armatures and field-magnet windings of the series-type, of means comprising a switching device having connections for disposing the motor armatures in series in series-parallel and in parallel relation and also having connections for varying the connections of certain parallel-connected portions of said field windings in all positions of the switching device.

2. In a system of control, the combination with a plurality of electric motors severally having armatures and field-magnet windings of the series-type, of a switching device having connections for disposing the motor armatures in series and series-parallel relation and auxiliary means for varying the connections of certain parallel-connected portions of said field windings in the different positions of the switching device.

3. In a system of control the combination with a plurality of pairs of electric motors severally having armatures and field-magnet windings, of means for connecting certain parallel-connected portions of said field windings in series relation with the remaining motor windings during one portion of the accelerating period, and means for subsequently connecting said field-winding portions in series relation with the corresponding pairs of parallel-related circuits that respectively comprise an armature and the remaining portion of a field winding.

4. In a system of control, the combination with a plurality of pairs of electric motors severally having armatures and field-magnet windings, of a switching device adapted to assume two positions, one corresponding to the connection of certain parallel-related portions of said field windings in series relation with the remaining motor windings during the first portion of the accelerating period, and the other position corresponding to the subsequent connection of said field-winding portions in series relation with the corresponding pairs of parallel-related circuits that respectively comprise an armature and the remaining portion of a field winding.

5. In a system of control, the combination with a plurality of pairs of electric motors severally having armatures and field-magnet winding, of means for connecting certain parallel-connected portions of said field windings in series relation with the remaining motor windings during one portion of the accelerating period, and means for subsequently connecting said field-winding portions in series relation with the corresponding pairs of parallel-related circuits that respectively comprise an armature and the remaining portion of a field winding, the current, in two of the motors being in reversed directions during series and parallel operation.

6. In a system of control, the combination with a plurality of pairs of electric motors severally having armatures and field-magnet windings, of a switching device adapted to assume two positions, one corresponding to the connection of certain parallel-related portions of said field windings in series relation with the remaining motors windings during the first portion of the accelerating period, and the other position corresponding to the subsequent connection of said field-winding portions in series relation with the corresponding pairs of parallel-related circuits that respectively comprise an armature and the remaining portion of a field winding, the current in two of the motors being in reversed directions during series and parallel operation.

7. In a system of control, the combination with a plurality of pairs of electric motors severally having armatures and field-magnet windings, of means for connecting all the armatures and field windings in series relation during one portion of the accelerating period, means for subsequently connecting certain parallel-connected portions of said field windings in series relation with the corresponding pairs of parallel-related circuits that respectively comprise an armature and the remaining portion of a field winding, and means for finally excluding said parallel-connected field-winding portions from circuit.

8. In a system of control, the combination with a plurality of pairs of electric motors severally having armatures and field-magnet windings, of a switching device adapted to assume two positions, one corresponding to the connection of all the armatures and field windings in series relation during the first portion of the accelerating period, and the other position corresponding to the subsequent connection of said field-winding portions in series relation with the corresponding pairs of parallel-related circuits that respectively comprise an armature and the remaining portion of a field winding.

9. In a system of control, the combination with a plurality of pairs of electric motors severally having armatures and field-magnet windings, of a switching device adapted to assume two positions, one corresponding to the connection of all the armatures and field windings in series relation during the first portion of the accelerating period, and the other position corresponding to the subsequent connection of said field-winding portions in series relation with the corresponding pairs of parallel-related circuits that respectively comprise an armature and the remaining portion of a field winding, and independent switching means for finally excluding said parallel-connected field-winding portions from circuit.

In testimony whereof, I have hereunto subscribed my name this 29th day of Dec. 1915.

FRANCIS E. WYNNE.

Copies of this patent may be obtained for five cents each, by addressing the "Commissioner of Patents, Washington, D. C."